No. 790,712. PATENTED MAY 23, 1905.
R. F. BOWER.
ROLLER BEARING.
APPLICATION FILED AUG. 23, 1904.

WITNESSES:
Jos. A. Ryan.
Perry B. Turpin.

INVENTOR
Robert F. Bower.
BY Munn & Co.
ATTORNEYS

No. 790,712. Patented May 23, 1905.

UNITED STATES PATENT OFFICE.

ROBERT FRANKLIN BOWER, OF LIMA, OHIO.

ROLLER-BEARING.

SPECIFICATION forming part of Letters Patent No. 790,712, dated May 23, 1905.

Application filed August 23, 1904. Serial No. 221,851.

*To all whom it may concern:*

Be it known that I, ROBERT FRANKLIN BOWER, a citizen of the United States, residing at Lima, in the county of Allen and State of Ohio, have invented a new and useful Improvement in Roller-Bearings, of which the following is a specification.

My invention is an improvement in roller-bearings, and especially in such bearings designed for use on vehicle-wheels; and the invention consists in certain novel constructions and combinations of parts, as will be hereinafter described and claimed.

Figure 1:
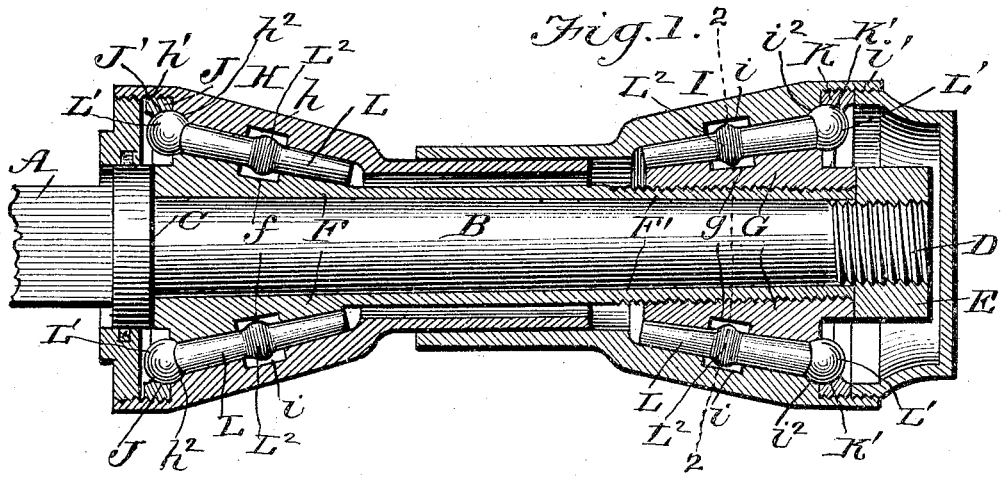
Figure 2:
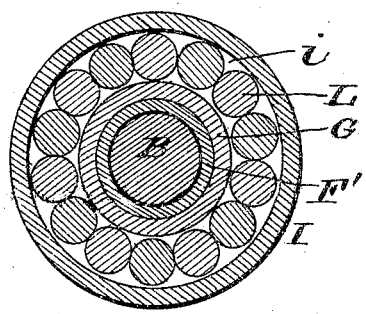
Figure 3:

In the drawings, Figure 1 is a longitudinal section of a portion of a vehicle-hub provided with my improvements. Fig. 2 is a cross-section on about line 2 2 of Fig. 1, and Fig. 3 is a detail side view of one of the rollers.

In the accompanying illustration I have presented the axle A with its spindle B, having the shoulder C at its inner end and its outer end threaded at D to receive the nut E, as is usual. The spindle B may be the ordinary spindle, and on it is fitted the inner cone F, bearing at its inner end against the shoulder C, grooved in its outer face at $f$ for the flange of the inner rollers and having at its outer end the tubular extension F', which is threaded to receive the outer cone G, which is grooved in its outer face at $g$ to receive the flanges of the outer set of rollers and is arranged at its outer end to be pressed against by the nut E, screwed on the stem D and serving not only as a jam-nut for the cone G, but also as a means for clamping the cone F against the shoulder C, and so holding it from turning on the spindle without necessitating the provision of keys and keyways, as might otherwise be necessary.

The outer casing consists of the sections H and I, which telescope at their inner ends one in the other and slide into the opposite ends of the hub, which is bored out to receive them. The sections H and I have cone portions corresponding to the cones F and G, are grooved at $h$ and $i$ opposite the grooves $f$ and $g$, and are rabbeted in their outer ends and threaded at $h'$ and $i'$ for the inner and outer race-rings J and K, and are grooved at $h^2$ and $i^2$ to receive the end balls L' on the rollers L, the rings J and K being also grooved at J' and K' to receive said balls, as shown in Fig. 1. The rollers are also provided with flanges $L^2$ to operate in the grooves in the cones and casing-sections.

In operation the end balls L', operating in the raceways provided by the grooves before described, prevent the rollers from getting out of alinement when one roller is smaller than another.

Having thus described my invention, what I claim as new, and desire to secure by Letters Patent, is—

1. The improvement in roller-bearings herein described comprising the combination of the spindle having a shoulder at its inner end and a threaded tenon at its outer end, the inner and outer cones fitted together and on the spindle, the nut on the spindle-tenon and bearing against the outer cone and clamping the cones upon the spindle, said cones having annular grooves in their outer faces, the casing-sections fitting together over the cones and provided in their inner faces with grooves opposite those in the cones and having at their ends the grooves for end balls on the rollers and threads for the race-rings, the race-rings engaging said threads and grooved for the roller-balls and the rollers having end balls whose diameters are greater than the diameters of the rollers immediately adjacent to said end balls, the latter being arranged and operating in the grooves in the race-rings and casing-sections and each of said balls being in contact with the adjacent balls whereby to prevent the rollers from getting out of alinement substantially as set forth.

2. The combination in a roller-bearing of the cone-sections, the casing-sections and the rollers provided at their ends with balls rigid with the rollers the diameters of the said end balls being greater than the diameters of the rollers immediately adjacent to said balls whereby inwardly-facing rounded shoulders are provided facing toward the opposite or inner ends of the rollers each of said balls being in contact with the adjacent balls substantially as set forth.

3. A roller-bearing comprising the combination with the cone-sections and the rollers having end balls rigid with the rollers, of the casing-sections having grooves to receive the end balls of the rollers and adapted to hold the said balls in contact with each other and the race-rings also provided with grooves receiving the said end balls the diameters of the end balls being greater than that of the rollers immediately adjacent to said balls whereby inwardly-facing shoulders are provided on the end rollers substantially as set forth.

4. The combination of the cones, and casing-sections grooved in their opposing surfaces, and the rollers having the intermediate flanges operating in said grooves and the end balls the diameters of the balls being greater than the diameters immediately adjacent to said balls and a race-ring receiving said end balls and holding the same in contact with each other substantially as set forth.

ROBERT FRANKLIN BOWER.

Witnesses:
WM. D. ALEXANDER,
JAS. D. CHAMBERS.